(12) United States Patent
Stickney et al.

(10) Patent No.: US 6,237,855 B1
(45) Date of Patent: May 29, 2001

(54) DIRECT CURRENT ELECTRICAL CONTROLS FOR HEATING SYSTEMS

(76) Inventors: Bristol L. Stickney, P.O. Box 533, Tesque, NM (US) 87574; Allan L. Sindelar, 3900 Paseo Del Sol, #201, Santa Fe, NM (US) 87505

( * ) Notice: Subject to any disclaimer, the term of this patent is extended or adjusted under 35 U.S.C. 154(b) by 0 days.

(21) Appl. No.: 09/383,496

(22) Filed: Aug. 26, 1999

(51) Int. Cl.[7] .................................................... F24D 3/00
(52) U.S. Cl. ............................................ 237/8 R; 237/8 A
(58) Field of Search .................................... 237/8 R, 8 A, 237/2 A; 236/46 C, 67; 307/66

(56) References Cited

U.S. PATENT DOCUMENTS

| | | | |
|---|---|---|---|
| 3,758,031 | * 9/1973 | Moran | 237/8 A |
| 4,020,488 | * 4/1977 | Martin et al. | 340/412 |
| 4,349,148 | 9/1982 | Liberto et al. . | |
| 4,400,626 | 8/1983 | Lacy . | |
| 4,420,693 | * 12/1983 | Becker et al. | 307/66 |
| 4,474,325 | 10/1984 | Richardson . | |
| 4,509,503 | 4/1985 | Young . | |
| 4,673,826 | 6/1987 | Masson . | |
| 4,946,096 | 8/1990 | Ballard et al. . | |
| 4,978,063 | 12/1990 | Chase . | |
| 5,249,596 | 10/1993 | Hickenlooper et al. . | |
| 5,422,808 | * 6/1995 | Catanese, Jr. et al. | 364/184 |
| 5,488,968 | * 2/1996 | Price et al. | 137/1 |
| 5,592,989 | 1/1997 | Lynn et al. . | |
| 5,622,221 | 4/1997 | Genga et al. . | |
| 5,739,504 | 4/1998 | Lyons et al. . | |
| 5,844,328 | * 12/1998 | Furst | 307/66 |
| 5,881,681 | 3/1999 | Stuart . | |

* cited by examiner

Primary Examiner—Denise L. Ferensic
Assistant Examiner—Derek S. Boles
(74) Attorney, Agent, or Firm—Dennis F. Armijo (57) ABSTRACT

A method and apparatus for controlling the normal operation of a hydronic heating system, (including AC powered, gas-burning hot water boiler, multi-zone systems) using a DC power source, such as battery power, as the primary continuous source of electricity. Control functions minimize the consumption of electric power during normal operation, and eliminate standby electric consumption in order to extend the life of the batteries and maximize the run-time of the heating system. A DC to DC converter supplies low voltage DC power to the zone thermostats, and also supplies the proper voltage through zone relays to operate DC zone pumps. By allowing the use of DC power for the thermostats and zone pumps, the system eliminates the need for transformers, zone valves, and AC circulators, resulting in a large savings in electrical consumption and the elimination of the standby electric demand ("phantom load") common in conventional hydronic heating systems. A DC to AC inverter is dedicated to supply AC power for a hydronic (hot water) boiler. The inverter is switched on by relays only when needed, thereby eliminating the "phantom electric load" consumed by most boilers when standing by. A time delay relay circuit allows the boiler to go through its proper shutdown sequence before power is removed. This control system does not require any internal modification to the other heating system components.

17 Claims, 6 Drawing Sheets

DIRECT CURRENT ELECTRICAL CONTROLS FOR HEATING SYSTEMS

BACKGROUND OF THE INVENTION

1. Field of the Invention (Technical Field)

The invention relates to heating system controls and more particularly to an apparatus and method of controlling hydronic and gas-fired hot-water space-heating systems utilizing DC or battery power.

2. Background Art

Control devices for heating systems are not new in the art. However, systems that are presently available utilize AC power sources that require standby electrical loads. These systems are inherently inefficient. Some prior art references illustrate this.

U.S. Pat. No. 5,622,221 to Genga, Jr., et al. discloses a control device for a multi zone hydronic boiler heating system using zone pumps. Genga, Jr. et al. discloses control system circuitry that is integrated into each individual zone pump requiring data-buss wiring between the pumps. The present invention is a central control system requiring only 2-conductor electric power wiring to the pumps. The main purpose of this prior art system is to provide priority zone control that is easily programmed using switches on the pumps, while the present invention can be wired to provide switchable priority control from the central control box. This control system requires 115 Volt AC as its primary power supply, while the present invention uses DC batteries for primary power. This control system requires low voltage transformers mounted on every pump, while the present invention eliminates most or all transformers.

U.S. Pat. No. 5,739,504 to Lyons, et al., teaches the control of the time duration of the operation of the flame in a boiler. The main purpose of Lyons' device is to allow accurate water level monitoring for steam boilers. The present invention is external to the boiler, and does not require alteration of any OEM wiring and allows the internal boiler controls to control the flame as installed by the manufacturer. The invention's time control circuit turns external power to the entire boiler on and off, not just the internal gas flame.

U.S. Pat. No. 4,474,325 to Richardson describes an internal control system that allows a hydronic boiler to be used to generate hot air for space heating. It includes electrical controls for a boiler, a pump, a fan, and a heat exchanger with safety controls for the gas flame. The control system is powered by AC 120 volt electricity through a transformer.

U.S. Pat. No. 5,881,681 to Stuart describes the internal components and controls of a hydronic boiler. The controls monitor the conditions inside the boiler and regulate the water temperature by modulating the flame combustion process.

U.S. Pat. No. 5,592,989 to Lynn, et al., allows thermostatic control of a number of electrical heating components that need several different voltages. This system is intended especially for fan coil unit heaters. This system uses special electronic thermostats with up to 13 signal wire connections, and is designed to control only AC voltages.

U.S. Pat. No. 4,349,148 to Liberto, et al., discloses a system and components needed to operate a hot air furnace using batteries as a temporary emergency power supply. This system uses DC batteries and a secondary power control circuit as a backup system when conventional AC power is unavailable, while the present invention uses DC batteries as the primary and continuous power supply and the control circuit as the primary heating system control. In addition, the present invention is designed around water circulator pumps, rather than fans, and the pumps are DC continuous, rather than auxiliary duty. The secondary power control circuit in the Liberto patent utilizes a complex arrangement of 3 inverters, to provide AC power to emergency relays, gas valve, and auxiliary DC fan.

U.S. Pat. No. 4,946,096 to Ballard, et al., discloses an emergency system that forces the furnace into a low electrical power demand mode when running on battery power, by disabling portions of the heating system when operating on battery power.

U.S. Pat. No. 4,673,826 to Masson describes a DC battery power supply that is controlled by digital microprocessors to provide power primarily for computers. This system uses digital command signals in response to a variety of system conditions, such as the state-of-charge of the batteries, the quality of the inverter output, and the presence or absence of conventional AC power.

U.S. Pat. No. 4,978,063 to Chase describes a configuration of relays that locks out the space heating zones whenever the domestic hot water heater calls for heat. This type of circuit is commonly known as a "Hot Water Priority" circuit because it gives priority to heating the water tank first, and then allows space heating only after the tank is hot.

U.S. Pat. No. 4,400,626 to Lacy describes a system developed mainly for aircraft application that reduces the electric power consumption during emergency power failure conditions by disconnecting non-critical electric loads.

None of the prior art, however, discloses a DC control unit as the primary source of power for the heating system to run at full capacity with high electric efficiency, little standby electric demand and continuous duty.

SUMMARY OF THE INVENTION (DISCLOSURE OF THE INVENTION)

In accordance with the present invention, there is provided an apparatus and method for controlling a hydronic heating system by utilizing a DC source of power, such as batteries. The preferred DC electrical controls for a hydronic heating system comprise a DC source, a DC to AC inverter to power a boiler, at least one DC zone pump, and DC relays for controlling the DC to AC inverter and the at least one DC zone pump. The preferred apparatus further comprises structure whereby the DC to AC inverter and the at least one DC zone pump and the DC relays do not draw an electric load when there is no call for heat. The preferred apparatus further comprises a DC to DC converter to convert the DC source to a predetermined DC voltage of the at least one DC zone pump. The preferred apparatus further comprises a DC to DC converter to convert the DC source to a predetermined DC voltage of the DC relays. The preferred apparatus further comprises at least one DC zone thermostat for controlling the DC relays. The preferred apparatus further comprises a DC to DC converter to convert the DC source to a predetermined DC voltage of the at least one DC zone thermostat. The DC relays can also comprise a time delay apparatus for delaying a removal of the power to the boiler. The apparatus can also comprise a link structure for linking a next DC zone pump.

The preferred DC electrical controls for a hot water space heating system comprise a hot water source, a DC source, at least one DC zone pump for pumping water from the hot water source, and DC relays for controlling the at least one DC zone pump. The preferred apparatus further comprises at least one DC zone thermostat for controlling the DC relays.

The preferred at least one DC zone thermostat does not draw an electric load when there is no call for heat. The preferred apparatus further comprises a DC to DC converter for converting the DC source to at least one predetermined DC voltage. The preferred at least one predetermined DC voltage comprises a voltage for the DC relays, the at least one DC zone pump and at least one DC zone thermostat. The preferred at least one DC zone pump and the DC relays do not draw an electric load when there is no call for heat. The apparatus can also comprise a link apparatus for linking a next DC zone pump.

The preferred method of controlling a hydronic heating system comprises the steps of providing a DC source, providing at least one DC zone thermostat, controlling at least one DC relay with the at least one DC zone thermostat, controlling at least one DC zone pump with the at least one DC relay, and pumping hot water with the at least one DC zone pump from a hot water source to at least one zone. The preferred method further comprises the step of converting the DC source to at least one predetermined DC voltage for the at least one DC zone thermostat, the at least one DC relay and the at least one DC zone pump. The method can further comprise the step of providing a link for linking a next DC zone pump. The method can also further comprise the step of delaying a shutdown of the hot water source. The preferred method further comprises the step of converting the DC source to an AC voltage for providing power to the hot water source.

A primary object of the present invention is to allow any AC hydronic boiler to operate normally and continuously when powered by DC batteries of any voltage.

Another object of the invention is to distribute hot water heat to multiple heating zones using DC pumps.

Yet another object of the invention is to operate multiple room thermostats with DC electric power and to control operation of DC zone pumps.

Another object of the invention is to create an easily packaged, easily installed hydronic heating control system that acts as an electrical interface between any DC electric source and the hydronic heating equipment.

Yet another object of the present invention is to allow any gas-fired hot water space heating system to operate normally and continuously when powered by DC electricity.

Another object of the invention is to allow hot water, provided by any heat source, including solar heat, to be distributed through a hydronic heating system using DC pumps and controls.

Another object of the invention is to provide control functions that minimize the consumption of electric power of any gas-fired hot water space heating system by reducing electric demand, both during standby and operation.

Another object of the present invention is to provide a packaged control system that allows a gas-fired water heater or hydronic boiler to be converted to DC operation without any internal modifications to the water heating equipment.

A primary advantage of the present invention is that it allows the owners of remote homes and other dwellings that get their electricity from batteries charged by photovoltaic (solar electric) panels, wind electric or fuel combustion or other AC or DC electric generators to install and operate hydronic heating systems without excessive or unnecessary electrical consumption.

Another advantage of the present invention is that it can eliminate both the AC transformers and zone valves, thereby eliminating the associated constant electrical demand of these components. This helps prolong battery life and can reduce or eliminate the need to run a backup generator to provide power for the heating system.

Yet another advantage of the present invention is that no internal modifications are required to any of the heating system equipment, so no special technical knowledge is needed for installation and maintenance, and original equipment warranties remain intact.

Another advantage of the present invention is that the use of DC zone pumps in place of conventional AC pumps with AC zone valves can provide a large savings in electrical consumption, which can further prolong battery life.

Yet another advantage of the present invention is that the control functions of this system shut off the standby electrical demand normally needed by conventional boilers and thermostat systems (also known as "phantom load"). No electric power is consumed by the heating equipment unless there is a call for heat from a room thermostat, even when using a conventional AC hydronic boiler with an internal transformer. This allows the heating system to stand by indefinitely without draining the batteries.

Another advantage of the present invention is that the electrical saving features of this control system can reduce the need for batteries, generator capacity, and AC inverter capacity, which can lower the initial size and cost of a DC electric power system.

Yet another advantage of the present invention is that the control system imposes no practical limit on the number of heating zones provided by a hydronic heating system, by allowing all heating zone controls to be chained together.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED
EMBODIMENTS (BEST MODES FOR
CARRYING OUT THE INVENTION)

Figure 1:
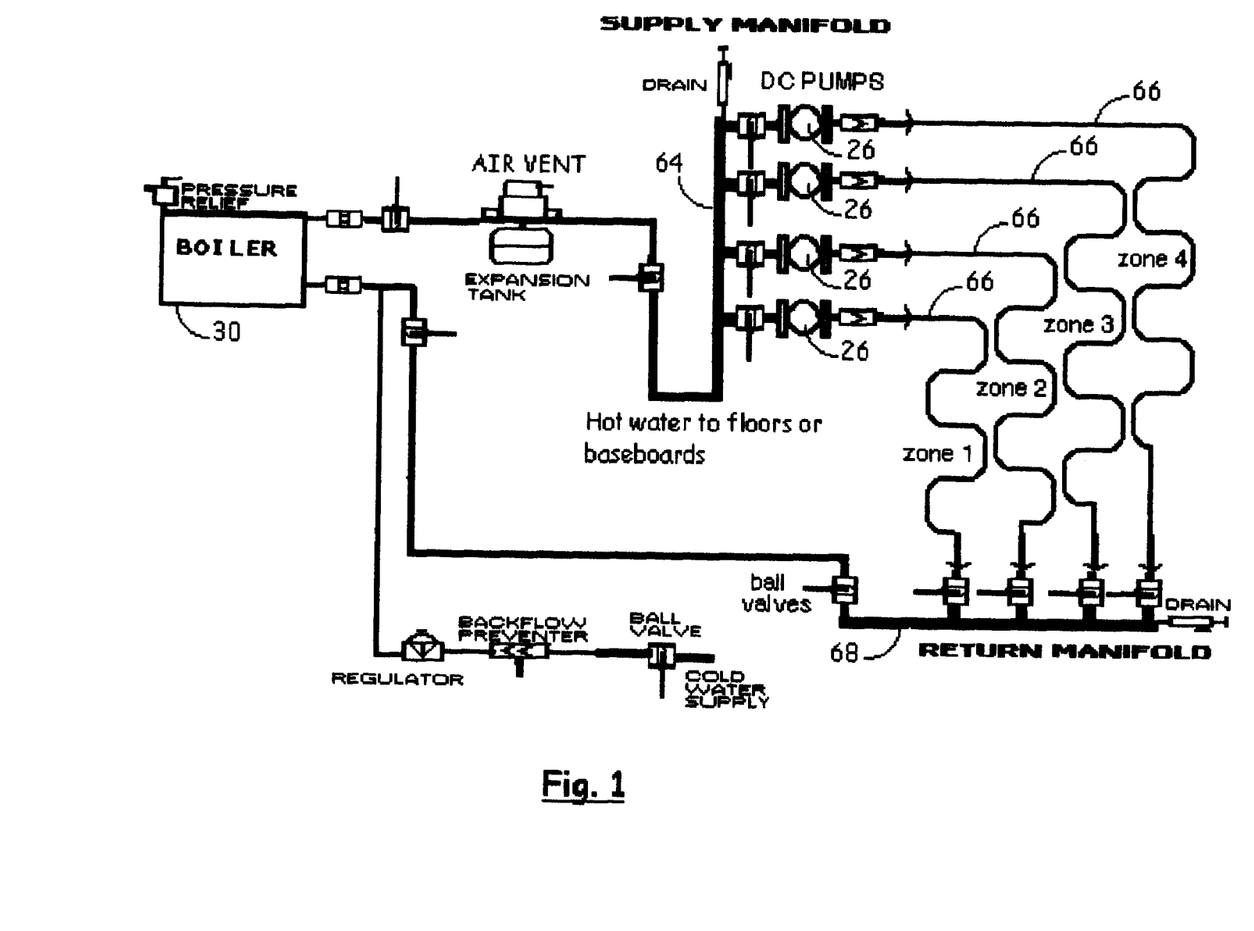
FIG. 1 is the plumbing diagram that shows the essential plumbing used for the application of the preferred embodiment.
Figure 2:
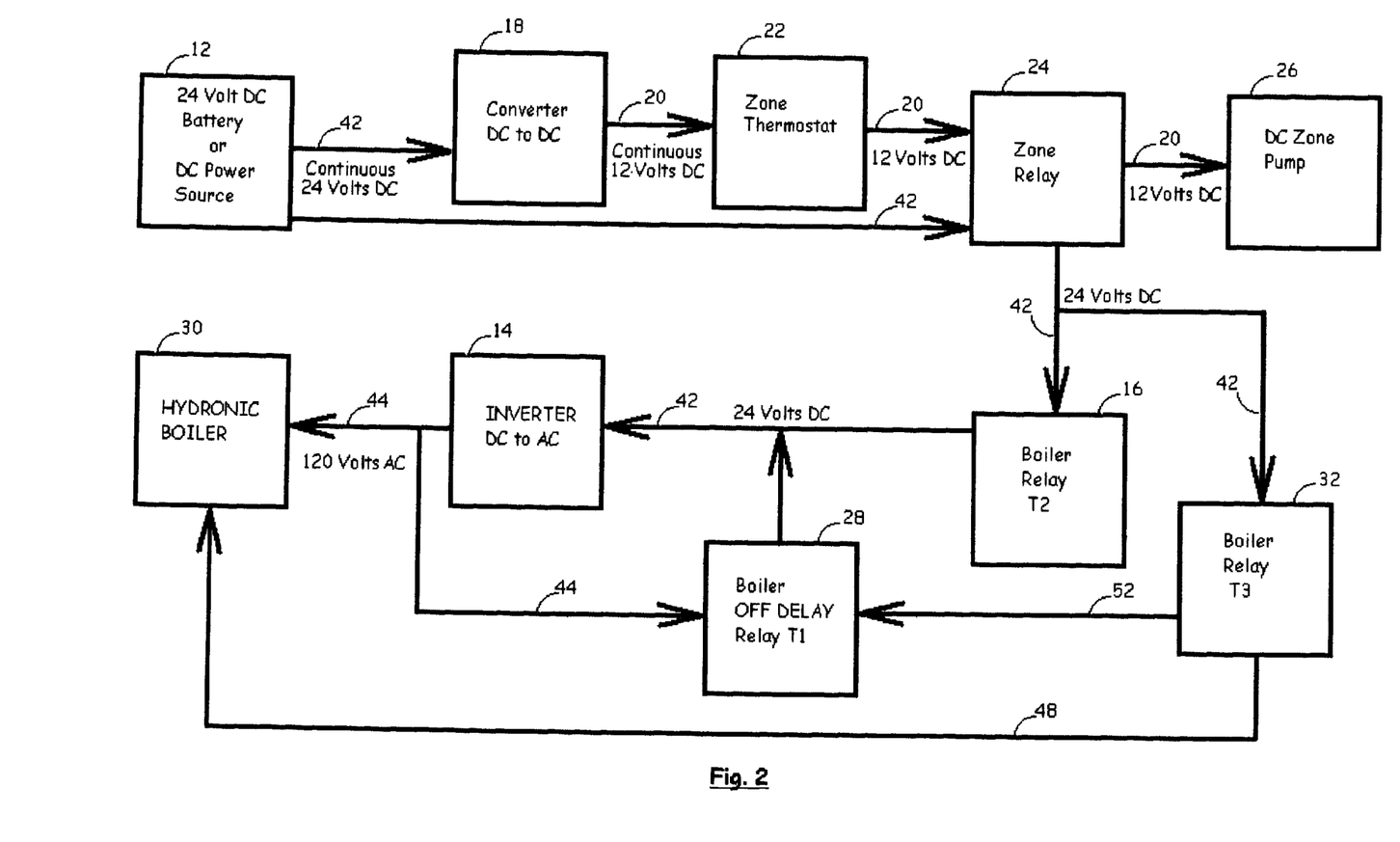
FIG. 2 is the flow chart that shows the control sequence of the preferred embodiment.
Figure 3:
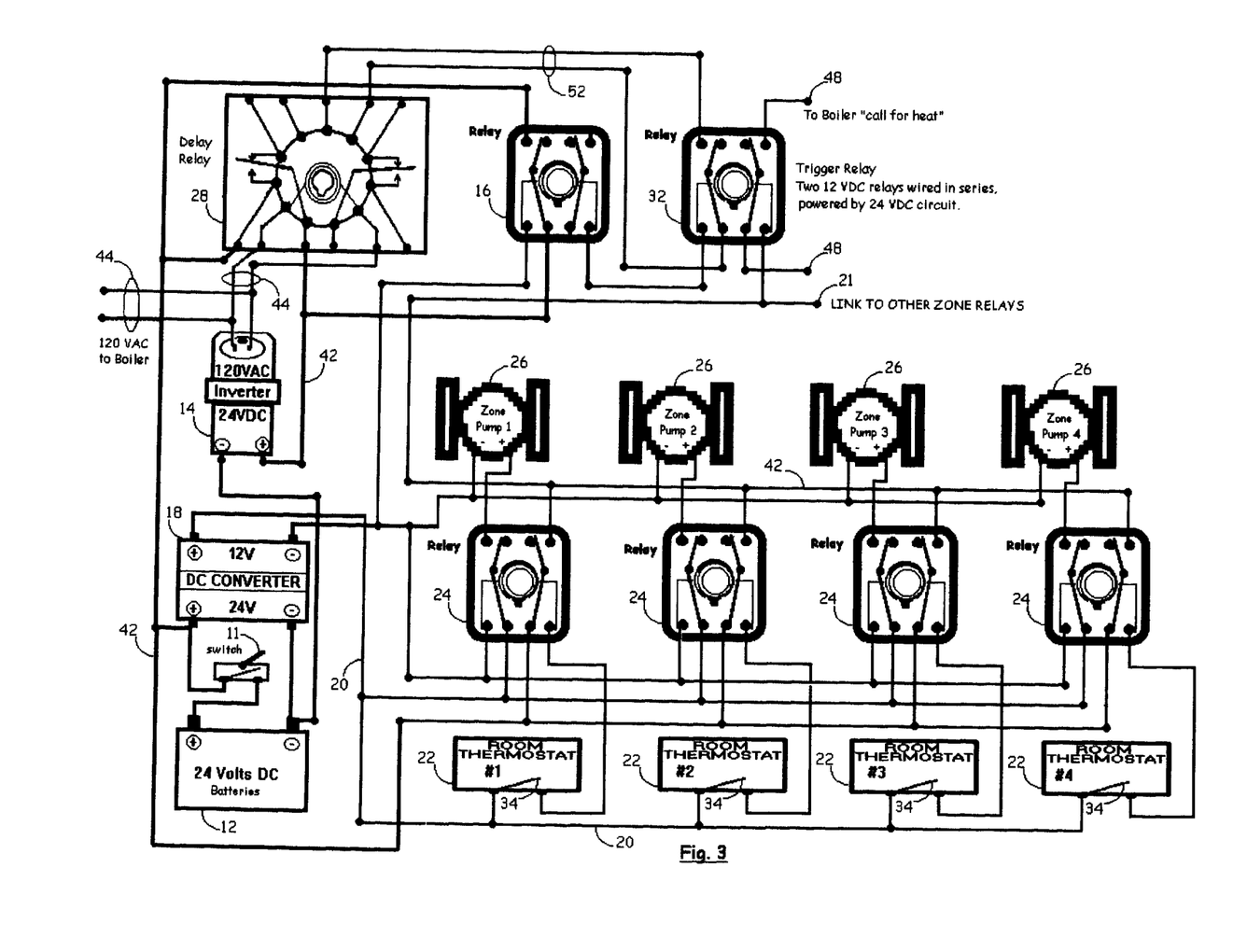
FIG. 3 is a schematic wiring diagram that shows the electrical connections between all the components in the preferred embodiment.

The preferred embodiment of the hydronic boiler system control is shown in FIGS. 1, 2, and 3. The invention comprises a method and apparatus for controlling the normal operation of a heating system, (including AC powered, gas-burning hot water boiler, multi-zone systems) using DC battery 12 power or a DC power source as the primary continuous source of electricity, that provides control functions which minimize the consumption of electric power, in order to extend the life of the batteries and maximize the run-time of the heating system.

The apparatus contains a small DC to AC inverter 14 such as Tumbler Technologies Model 24-15013, or the like, dedicated to provide AC power to boiler 30. DC to AC inverter 14 is switched on by inverter relay 16 only when needed, thereby eliminating the "phantom electric load" consumed by most boilers when they are standing by.

A DC to DC converter 18 is included in the apparatus to provide 12 volts DC 20 power to zone thermostats 22, thereby eliminating the need for a transformer and the phantom load that it would consume. DC to DC converter (such as the ICT model ICT 2412-10A or the like) 18 also provides 12 volts DC 20 electricity through zone relays 24 (such as WW Graingers DPDT model 1A484 or the like) to operate DC zone pumps 26, when actuated by corresponding zone thermostats 22. By using DC zone pumps 26 instead of the more conventional AC zone valves, the need for a transformer or transformers to power the zone valves is eliminated thereby saving the phantom load each transformer would consume as well as eliminating the power consumed by the zone valves themselves. By using DC zone pumps 26 the need for a more conventional AC circulator pump or pumps is eliminated which can result in further electrical savings due to the higher efficiency or smaller size of DC zone pumps 26.

A time delay relay 28 (such as WW Graingers model 6×154, or the like) is provided to allow boiler 30 to go through its proper shut-down sequence before power is removed by shutting off DC to AC inverter 14. This allows the normal use of motorized flue dampers (not shown) which are commonly available on many boilers to enhance fuel efficiency without any internal modification to boiler 30.

This invention is applicable to dwellings that are constructed with hot water heat plumbing (such as radiant heated floors or hot water baseboards) are wired for low voltage room thermostats, require an AC powered hydronic boiler to provide the heat, and have DC batteries as the source of electrical power for the heating system. Boiler 30 may be installed using DC zone pumps 26 as shown in FIG. 1. DC zone pumps 26 can be HARTELL models 3HEL and 10HEH, IVAN Labs model SID10, or the like.

A typical plumbing configuration for a gas-fired hydronic boiler heating system is shown in FIG. 1. A boiler 30 provides hot water to a plurality of heating zones. DC zone pumps 26 are provided to pump hot water to each zone, which flows out of hot supply manifold 64, through zone plumbing 66 where heat is delivered, and back to boiler 30 through return manifold 68.

Simple low voltage thermostats, preferably the kind with two wires that act as a simple mechanical switch, can be installed as zone thermostats 22. This can be done according to common practice and is not unique to this invention.

The wiring diagram of FIG. 3 shows how the components mentioned above are connected together using single conductor, insulated wire. Although this preliminary wiring diagram shows 4 zones, the preferred embodiment uses six zone relays in each control box. Boxes can be linked together to create any number of heating zones by wiring the "link" terminals 21 together.

The flow chart of FIG. 2 shows the sequence of the control process. It shows the order in which each component is activated, and what kind of electrical output or end use it provides. The process starts at the 24 volt battery 12, and ends by simultaneously energizing (or shutting down) boiler 30 and DC zone pump(s) 26.

When the heating system is activated by turning on switch 11, the 24 volt battery 12 supplies continuous power to DC to DC converter 18, which uses an extremely small amount of electricity from 24 volt battery 12 when standing by. DC to DC converter 18 provides 12 volts DC 20 to zone thermostats 22 and zone relays 24.

When a zone thermostat 22 calls for heat, the switch contacts 34 inside the zone thermostat 22 send 12 volts DC 20 to energize the corresponding zone relay 24. (There is one zone relay 24 per thermostat 22). Zone relay 24 then simultaneously sends 12 volts DC 20 power to the corresponding zone pump 26, and sends 24 volts DC 42 power to the boiler trigger relay 32 and the inverter relay 16.

When inverter relay 16 is energized, it sends 24 volts DC 42 electric power to DC to AC inverter 14. DC to AC inverter 14 now produces 120 volts AC power 44 which energizes boiler 30 and time delay relay 28 simultaneously.

When boiler trigger relay 32 is energized (at the same time as inverter relay 16) it sends a "call for heat" signal 48 to boiler 30, allowing it to go through a normal firing sequence to start the gas flame and produce more heat. Boiler trigger relay 32 simultaneously sends a "switch closed" signal 52 to the time delay relay 28. This energizes time delay relay 28 which sends, 24 volts DC 42 to DC to AC inverter 14 to keep boiler 30 running.

When zone thermostat 22 is satisfied, and no longer needs heat, its switch contacts 34 open. This shuts off power to the corresponding zone relay 24, which in turn shuts off power to DC zone pump 26 and also shuts off power to boiler trigger relay 32 and inverter relay 16.

Inverter relay 16 no longer sends power to DC to AC inverter 14, but time delay relay 28 is still energized and so continues to send 24 volts DC 42 power the DC to AC inverter 14.

Boiler trigger relay 32 stops sending a "call for heat" signal 48 to boiler 30, which proceeds to go through a normal shut down sequence internally, shutting off the gas flame and closing the flue damper (not shown).

Boiler trigger relay 32 also stops sending the "switch closed" signal 52 to time delay relay 28, which signals the time delay relay 28 to begin its time delay function. It begins counting down the time before it will shut off power to DC to AC inverter 14. The time delay is adjustable with a knob (not shown) but typically in less than a minute the boiler completes its shut down sequence and it is then safe to disconnect 120 volts AC power 44 from boiler 30. At the end of the count down function, time delay relay 28 then shuts down DC to AC inverter 14, which removes power from boiler 30 and itself (time delay relay 28) simultaneously.

Once the "Boiler Off" sequence is complete, the only standby electric load drawing power from batteries 12 is the negligible standby load of DC to DC converter 18.

In heating systems that use a gas-fired water heater instead of a boiler, the same control device and methods are used as set forth above, but with two exceptions. First, since a water heater does not require AC electrical power for normal operation as a boiler does, the inverter circuits are not included in the control device. Second, since the water heater does not have a motorized flue damper, the time delay relay circuit is not included.

This version of the packaged control system is known as the "Light" control box, to differentiate it from the version described in the embodiment of FIGS. 1, 2, and 3, which is known as the "Stout". The "Light" control box can be used by itself for hot water heater system control, or it can be used together with a "Stout" control box to expand the number of heating zones in a hydronic boiler system. As shown in FIG. 3, when used for zone expansion, a single-conductor insulated wire is connected to the "Link" terminal 21 on both boxes. By chaining a wire to connect all the "Link" terminals 21 together, any number of "Light" control boxes can be used together to create any number of heating zones.

Figure 4:
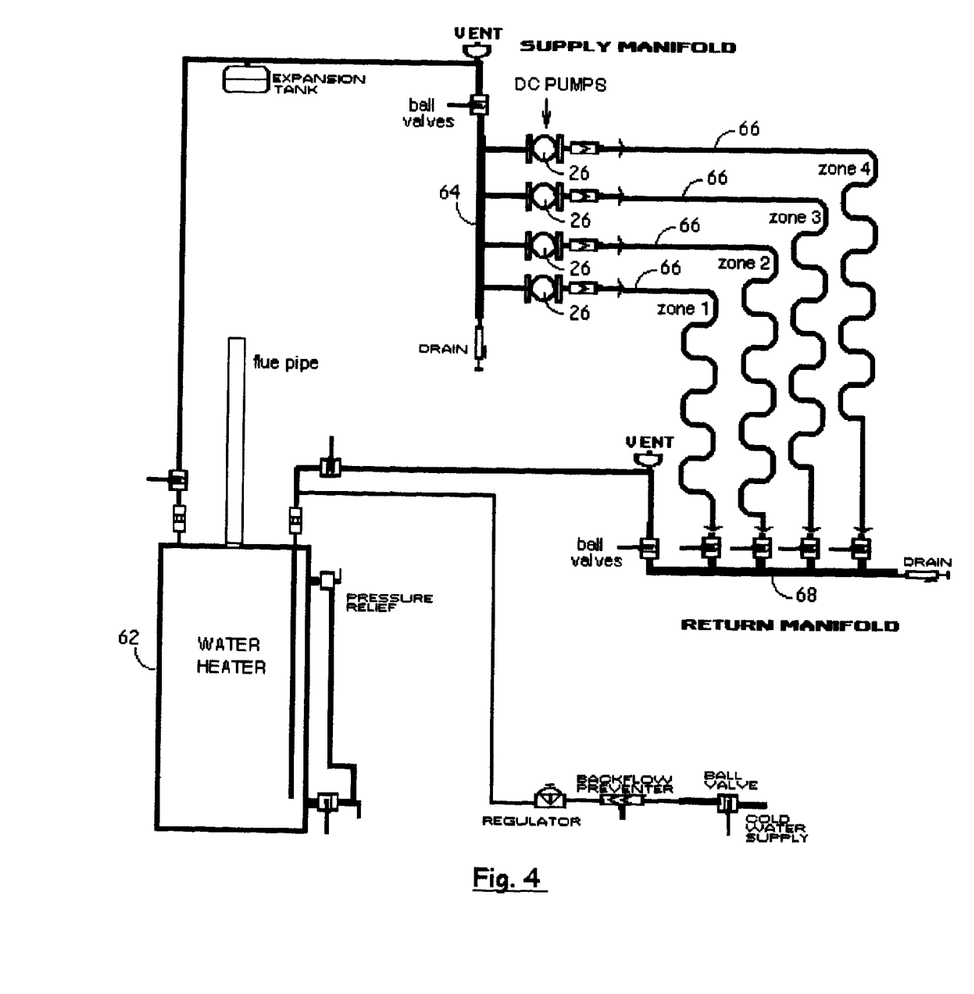
FIG. 4 is the plumbing diagram that shows the essential plumbing used for the gas-fired water heater embodiment.
Figure 5:
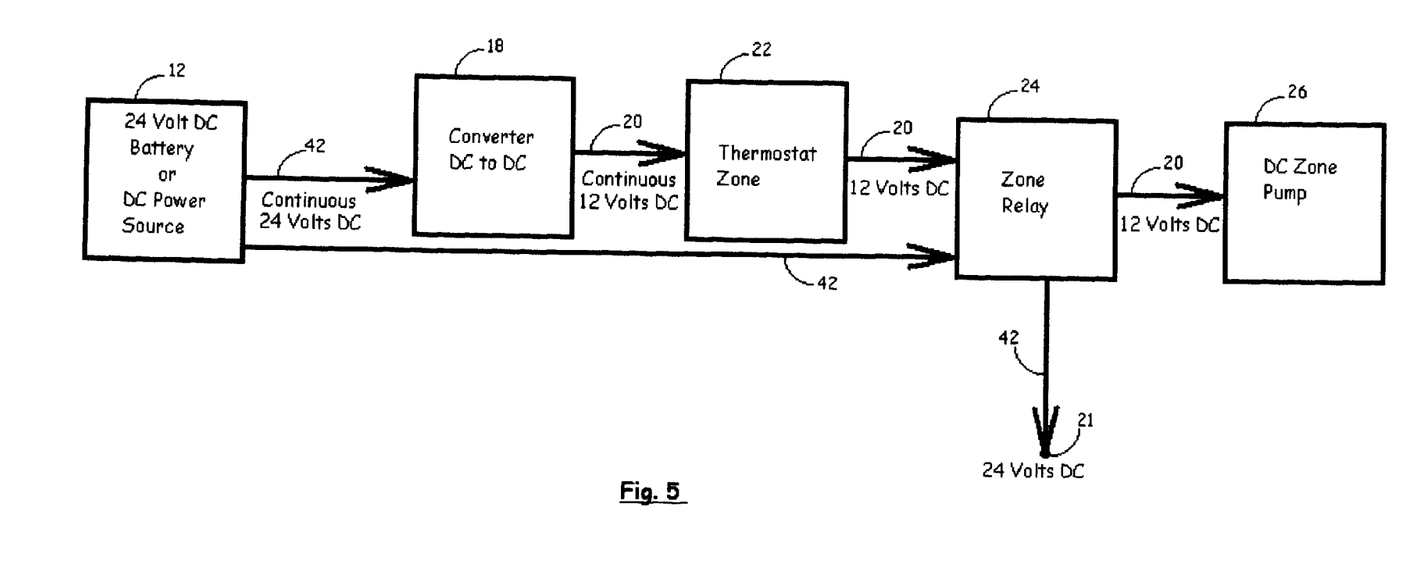
FIG. 5 is the flow chart that shows the control sequence provided by the system of FIG. 4.
Figure 6:
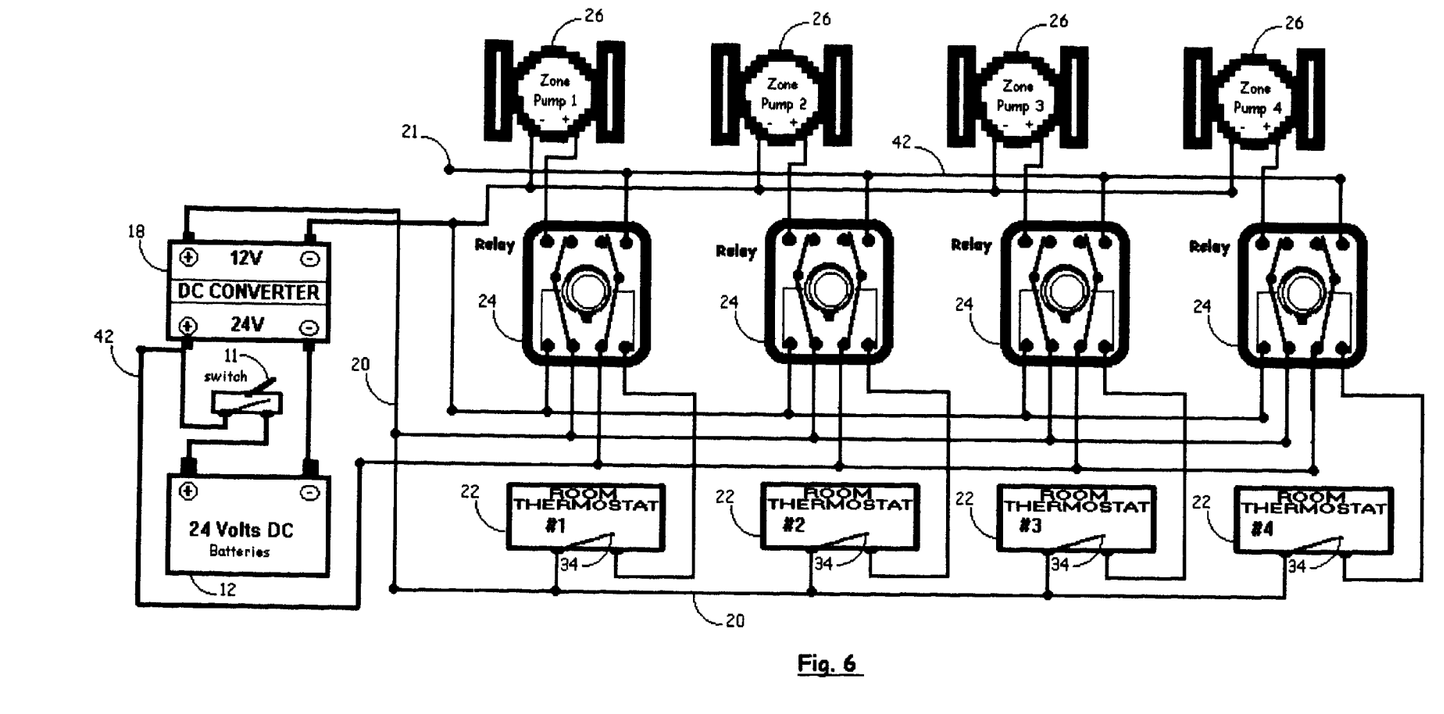
FIG. 6 is the schematic wiring diagram that shows the electrical connections between all the components in the control system of FIG. 4.

The gas-fired hot water heating control system is shown in FIGS. 4, 5, and 6. A hot water heater 62 provides hot water to a plurality of heating zones. DC zone pumps 26 are provided to pump hot water to each zone, which flows out of hot supply manifold 64, through zone plumbing 66 where heat is delivered, and back to water heater 62 through return manifold 68. The "Light" control system provides 12 volts DC 20 power to DC zone pumps 26, and also powers zone thermostats 22 using 12 volts DC 20 electricity. In an alternative use for this control system, it can be connected to the "Stout" system shown in FIGS. 1, 2, and 3 at the "Link" terminal 21 to add more heating zones to a "Stout" system as described above.

This embodiment is applicable to dwellings that are constructed with hot water heat plumbing, are wired for low voltage room thermostats, require a gas fired water heater as the source of heat, and have DC batteries as the primary source of electrical power. A water heater may be installed using DC zone pumps as shown in the plumbing diagram of FIG. 4.

Simple low voltage thermostats 22, the kind with two wires that act as a simple mechanical switch, can be installed as room thermostats. This can be done according to common practice and is not unique to this control system.

The wiring diagram of FIG. 6 shows how the control system components are connected together using single conductor, insulated wire. Although this preliminary wiring diagram shows 4 zones, the preferred embodiment uses six zone relays in each control box. Boxes can be linked together to create any number of heating zones.

The flow chart of FIG. 5 shows the sequence of the control process. The process starts at 24 volt battery 12, and ends by energizing (or shutting down) DC zone pump(s) 26. A 24 volts DC 42 call for heat signal is also provided at "Link" terminal 21 whenever any DC zone pump 26 is energized.

When the heating system is activated by turning on switch 11, 24 volt battery 12 supplies continuous power to DC to DC converter 18, which uses an extremely small amount of electricity from 24 volt battery 12 when standing by. DC to DC converter 18 provides 12 volts DC power 20 to zone thermostats 22, the zone relays 24.

When a zone thermostat 22 calls for heat, the switch inside the thermostat 34 sends 12 volts DC 20 to a corresponding zone relay 24. (There is one zone relay per thermostat). The zone relay 24 simultaneously sends 12 volts DC 20 power to the corresponding DC zone pump 26, and sends 24 volts DC 42 power to "Link" terminal 21.

When heat is provided by a water heater 62, the internal controls (not shown) of the water heater regulate the gas heat to maintain a steady supply of hot water to the zone pump as provided by the manufacturer of the water heater.

When heat is provided by a hydronic boiler 30, the "Link" signal 21 is used to start the boiler 'ON' sequence as described in the embodiment of FIGS. 1, 2, and 3.

When zone thermostat 22 is satisfied, and no longer needs heat, its switch contacts 34 open. This shuts off power to the corresponding zone relay 24, which in turn shuts off power to the DC zone pump 26 and also shuts off power to "Link" terminal 21.

When heat is provided by a water heater 62, the internal controls of the water heater allow the gas heat to continue to provide heat to the water heater until the internal thermostat controls shut it off (not shown). Control of the gas flame in a water heater happens independently of the "Light" control system, as provided by the manufacturer of the water heater.

When heat is provided by a hydronic boiler, the "Link" signal 21 is used to activate the Boiler 'OFF' Sequence as described in the embodiment of FIGS. 1, 2, and 3.

Once the heat delivery 'OFF' sequence is complete, the only standby electric load drawing power from the batteries 12 is the negligible standby load of the DC to DC converter 18.

In the descriptions above, the power source calls for 24 volts DC. However, any other DC voltage can be used with the appropriate changes to the components.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. DC electrical controls for a hydronic heating system comprising:
    a DC source;
    a DC to AC inverter to power a boiler;
    at least one DC zone pump; and
    DC relay means for controlling said DC to AC inverter and said at least one DC zone pump, wherein said DC to AC inverter and said at least one DC zone pump and said DC relay means do not draw an electric load when there is no call for heat.
2. The invention of claim 1 further comprising a DC to DC converter to convert said DC source to a predetermined DC voltage of said at least one DC zone pump.
3. The invention of claim 1 further comprising a DC to DC converter to convert said DC source to a predetermined DC voltage of said DC relay means.
4. The invention of claim 1 further comprising at least one DC zone thermostat for controlling said DC relay means.
5. The invention of claim 4 further comprising a DC to DC converter to convert said DC source to a predetermined DC voltage of said at least one DC zone thermostat.
6. The invention of claim 1 wherein said DC relay means further comprises a time delay means for delaying a removal of said power to said boiler.
7. The invention of claim 1 further comprising a link means for linking a next DC zone pump.
8. DC electrical controls for a hot water space heating system comprising:
    a hot water source:
    a DC source;
    at least one DC zone pump for pumping water from said hot water source;
    DC relay means for controlling said at least one DC zone pump; and at least one DC zone thermostat for controlling said DC relay means, wherein said at least one DC zone thermostat does not draw an electric load when there is no call for heat.

9. The invention of claim 8 further comprising a DC to DC converter for converting said DC source to at least one predetermined DC voltage.

10. The invention of claim 9 wherein said at least one predetermined DC voltage comprises a voltage for said DC relay means, said at least one DC zone pump and at least one DC zone thermostat.

11. The invention of claim 8 wherein said at least one DC zone pump and said DC relay means do not draw an electric load when there is no call for heat.

12. The invention of claim 8 further comprising a link means for linking a next DC zone pump.

13. A method of controlling a hydronic heating system comprising the steps of:
a) providing a DC source;
b) providing at least one DC zone thermostat;
c) controlling at least one DC relay with the at least one DC zone thermostat;
d) controlling at least one DC zone pump with the at least one DC relay; and
e) pumping hot water with the at least one DC zone pump from a hot water source to at least one zone, wherein the DC zone thermostat and the at least one DC zone pump and the at least one DC relay do not draw an electric load when there is no call for heat.

14. The method of claim 13 further comprising the step of converting the DC source to at least one predetermined DC voltage for the at least one DC zone thermostat, the at least one DC relay and the at least one DC zone pump.

15. The method of claim 13 further comprising the step of providing a link for linking a next DC zone pump.

16. The method of claim 13 further comprising the step of delaying a shutdown of the hot water source.

17. The method of claim 13 further comprising the step of converting the DC source to an AC voltage for providing power to the hot water source.

* * * * *